United States Patent
Meng et al.

(10) Patent No.: US 12,110,635 B2
(45) Date of Patent: Oct. 8, 2024

(54) GERM-REPELLENT BOOK AND FOOD PAPER PACKAGING, AND METHOD OF MANUFACTURE

(71) Applicant: Main Choice Paper Products Limited, Chai Wan (HK)

(72) Inventors: Wenjun Meng, Shatin (HK); Pit Shing Tung, Kowloon (HK); Wai Hong Yu, Shatin (HK); Mingyu Zhang, Shatin (HK)

(73) Assignee: MAIN CHOICE PAPER PRODUCTS LIMITED, Chai Wan (HK)

( * ) Notice: Subject to any disclaimer, the term of this patent is extended or adjusted under 35 U.S.C. 154(b) by 467 days.

(21) Appl. No.: 17/310,125

(22) PCT Filed: Apr. 7, 2020

(86) PCT No.: PCT/CN2020/083480
§ 371 (c)(1),
(2) Date: Jul. 19, 2021

(87) PCT Pub. No.: WO2020/207372
PCT Pub. Date: Oct. 15, 2020

(65) Prior Publication Data
US 2022/0064861 A1    Mar. 3, 2022

(30) Foreign Application Priority Data
Apr. 8, 2019 (HK) .......................... HK19121974.0

(51) Int. Cl.
*D21H 21/36* (2006.01)
*D21H 19/14* (2006.01)
*D21H 23/32* (2006.01)

(52) U.S. Cl.
CPC ............. *D21H 21/36* (2013.01); *D21H 19/14* (2013.01); *D21H 23/32* (2013.01)

(58) Field of Classification Search
CPC ........ D21H 21/14; D21H 21/24; D21H 21/36; D21H 21/50; D21H 19/80; D21H 19/84
See application file for complete search history.

(56) References Cited

U.S. PATENT DOCUMENTS

| | | | |
|---|---|---|---|
| 7,790,217 | B2 | 9/2010 | Toreki et al. |
| 8,545,862 | B2 | 10/2013 | Toreki et al. |
| 10,391,806 | B2 | 8/2019 | Demange et al. |
| 10,525,614 | B2 | 1/2020 | Lau et al. |
| 2005/0014882 | A1 | 1/2005 | Brungardt et al. |
| 2005/0249880 | A1 | 11/2005 | Wallace et al. |
| 2007/0243237 | A1 | 10/2007 | Khaled et al. |

FOREIGN PATENT DOCUMENTS

CN     103265655      6/2016

*Primary Examiner* — Micah Paul Young
(74) *Attorney, Agent, or Firm* — Muncy, Geissler, Olds & Lowe, P.C.

(57) ABSTRACT

A germ-repellent paper product contains a paper substrate and a germ-repellent overprint varnish. The germ-repellent overprint varnish contains a varnish and a germ-repellent agent. The germ-repellent overprint varnish is coated onto the paper substrate to form a germ-repellent paper product. A method for manufacturing such a germ-repellent paper product is also provided.

18 Claims, No Drawings

GERM-REPELLENT BOOK AND FOOD PAPER PACKAGING, AND METHOD OF MANUFACTURE

FIELD OF THE INVENTION

The present invention relates to paper products, specifically for books and food paper packaging, uses therefor and methods of manufacturing. More specifically, the present invention relates to paper products, specifically for books and food paper packaging, coated with a varnish, uses therefor and methods of manufacturing.

BACKGROUND

Current paper products, especially books and food paper packages, are coated with varnishes which only provide protection to physical damage and confer resistance to water and grease. However, active paper packages with antibacterial properties are in market demand due to the global trend of transforming the food safety system by shifting the focus from responding to foodborne illness to preventing it. While plastic resins having germ-repellent properties are well-known (see, e.g., WO 2016/110271 A1 to Lau, et al., published on 15 Jul. 2016, and assigned to Nano and Advanced Materials Institute Ltd., Hong Kong, S.A.R.), it would be advantageous to provide varnishes for used on paper products with germ-repellent properties.

Paper is especially a difficult material to make germ-repellent because of it is typically highly-porous, has a high hydrophilicity, absorbency and provides organic cellulose as growth media. During transportation and storage, microbes may easily attach and grow on paper and paper products. Conventional antimicrobial technology relies on the use of biocides, such as organic molecules (triclosan, chlorhexidine, etc.) and inorganic nanoparticles (nanosilver, nanocopper, etc.), which migrate from the bulk to the surfaces to kill the bacteria on the surface. Apart from the susceptibility of leaching and body intake of these chemicals or nanoparticles through contacting foods and drinks, the biocidal method might also lead to the creation/evolution of antimicrobial-resistant supergerms/superbacteria which are resistant to the biocide(s).

In the paper industry, overprint varnishing is typically performed as part of the finishing processes for aesthetic purposes or to protect the printing from moisture, abrasion, or other potential sources of damage. Therefore, the varnish coated on the top layer of the finished paper products could be further modified to make the finished products less attractive to bacterial adhesion.

Accordingly, it is desirable to provide a paper product having a germ-repellent paper without the need for a biocide, and/or which is not potentially harmful (to mammals; or people) if ingested. It is also desirable to provide paper having a reduced bacteria/microbe adhesion. It is also desirable to provide a paper material which provides reduced absorption of bacteria and/or microbes into the paper. It is also desirable to provide a germ-repellent paper which can be easily manufactured using existing manufacturing machinery and processes. It is also desirable to provide a germ-repellent paper that can be made using existing varnishes and coating methods.

SUMMARY OF THE INVENTION

The present invention relates to a germ-repellent paper product containing a paper substrate and a germ-repellent overprint varnish. The germ-repellent overprint varnish contains a varnish and a germ-repellent agent. The germ-repellent overprint varnish is coated onto the paper substrate to form a germ-repellent paper product. Herein, the varnish is specifically selected from the group of a water-based varnish, an oil-based varnish, and a combination thereof. Herein, the paper is selected from art-board paper, Kraft paper, wood-free paper, and a combination thereof.

In an embodiment herein, the invention relates to a process for manufacturing a germ-repellent paper product comprising the steps of providing a paper substrate, providing a germ-repellent overprint varnish, coating the surface of the paper substrate with the germ-repellent overprint varnish, and curing the germ-repellent overprint varnish to form a germ-repellent paper product.

Without intending to be limited by theory it is believed that the present invention provides a germ-repellent varnish-coated paper product which is more slippery to germs than a comparable paper product and/or a paper substrate/product coated with an unmodified overprint varnish. Without intending to be limited by theory, it is believed that germs will more easily become dislodged, fall off and/or be less likely to adhere to the germ-repellent paper product herein as compared to a comparable paper product coated with an unmodified overprint varnish.

Furthermore, it is believed that as the current invention is not an anti-bacterial, microbiocidal, or other germ-killing technology, it is unlikely to lead to the emergence of "superbugs" and other multi-resistant bacteria and germs. Accordingly it is believed that the present invention reduces the initial adhesion and/or absorption of germs to the germ-repellent paper product.

DESCRIPTION OF THE PREFERRED EMBODIMENTS

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise.

Unless otherwise specifically-noted, these chemicals are commodity chemicals available from multiple worldwide vendors in a variety of grades and variations.

As used herein, the term "a germ" indicates a microbe; or bacteria.

As used herein, the term "germ-repellent" when describing a material (or paper, etc.) and its other grammatical forms, such as "germ-repellency", etc. indicate that the material reduces the physical adhesion; or the initial physical adhesion, of microbes, bacteria, etc. to the material (or paper, etc.) and/or enhances the likelihood that they become physically dislodged from the plastic material.

An embodiment of the present invention relates to a germ-repellent paper product containing a paper substrate and a germ-repellent overprint varnish. The germ-repellent overprint varnish contains a varnish and a germ-repellent agent. The germ-repellent overprint varnish is coated onto the paper substrate to form a germ-repellent paper product.

In an embodiment herein, the invention relates to a process for manufacturing a germ-repellent paper product comprising the steps of providing a paper substrate, providing a germ-repellent overprint varnish, coating the surface of the paper substrate with the germ-repellent overprint varnish, and curing the germ-repellent overprint varnish to form a germ-repellent paper product.

In an embodiment herein, the germ-repellent agent is selected from the group of sodium alkylbenzene sulfonate (CAS #68411-30-3), sodium lauryl sulfate (CAS #151-21-3), sodium bis(2-ethylhexyl) sulfosuccinate (CAS #577-11-7), poly(acrylaminde-co-diallyldimethylammonium chloride (CAS #26590-05-6), poly(acrylamide-co-acrylate-co-diallyldimethylammonium) (CAS #25136-75-8), Poly(diallyldimethylammonium chloride) (CAS #26062-79-3) and a combination thereof; or sodium dodecylbenzenesulfonate (CAS #25155-30-0), sodium lauryl sulfate (CAS #151-21-3), sodium bis(2-ethylhexyl) sulfosuccinate (CAS #577-11-7), poly(acrylaminde-co-diallyldimethylammonium chloride (CAS #26590-05-6), poly(acrylamide-co-acrylate-co-diallyldimethylammonium) (CAS #25136-75-8), poly(diallyldimethylammonium chloride) (CAS #26062-79-3) and a combination thereof.

In an embodiment herein, the germ-repellent agent is selected from the group of poly(sodium 4-styrenesulfonate) (CAS #25704-18-1), sodium sulfate (CAS #7757-82-6), sodium lauryl sulfate (CAS #151-21-3), sodium bis(2-ethylhexyl) sulfosuccinate (CAS #577-11-7), sodium alkylbenzene sulfonate (CAS #68411-30-3), sodium dodecylbenzenesulfonate, (CAS #25155-30-0), poly(acrylamide-co-diallyldimethylammonium chloride (CAS #26590-05-6) and a combination thereof; or sodium alkylbenzene sulfonate (CAS #68411-30-3), poly(acrylamide-co-acrylate-co-diallyldimethylammonium) (CAS #25136-75-8), and a combination thereof; or sodium dodecylbenzene sulfonate, poly(diallyldimethylammonium chloride) (CAS #26062-79-3) and a combination thereof.

These germ-repellent agents are available from many suppliers worldwide in a variety or grades and forms. For example, sodium dodecylbenzenesulfonate is available from Sigma Aldrich; sodium dodecylbenzenesulfonate IRO Premium Grade SDBS 90 is available from IRO Coating Additive Co., Ltd. of Qingdao, China; Polyquaterinium-7 is available from Hangzhou Yinhu Chemical Co., Ltd of Hangzhou, China; and Poly(diallyldimethylammonium chloride) (SNF): Floquat FL 4540 is available from SNF China Flocculant Co. Ltd. of Jiangsu China.

An overprint varnish is a liquid coating which contains a resin therein. When coated upon a paper material, the overprint varnish dries and hardens into a hard, transparent film which protects the paper material from, for example, moisture, staining, absorbing liquids, etc. The resins therein are typically polymeric resins and are well-known in the art and may be a water-based varnish or an oil-based varnish, as desired; or a water-based varnish; or an oil-based varnish.

Examples of the overprint varnish useful herein include: OPV WBS108, Water-based varnish, available from Swan Coatings (M) SDN. BHD, Seleangor, Malaysia; and C Ecopure M-SPEC OP varnish, available from SAKATA INX of Moaming China.

Water-Based Varnish

Water-based varnishes are well-known in the art and are available from a variety of suppliers worldwide. When using a water-based varnish, then the germ-repellent agent herein may be, for example, sodium lauryl sulfate (CAS #151-21-3), sodium bis(2-ethylhexyl) sulfosuccinate (CAS #577-11-7), and a combination thereof; or sodium alkylbenzene sulfonate (CAS #68411-30-3), and a combination thereof; or sodium dodecylbenzenesulfonate (CAS #25155-30-0).

Without intending to be limited by theory, it is believed that the polar sulfonate/sulfate group increases the hydrophilicity of the coated surface; therefore water molecules will bind tightly on the surface to form a strong hydration layer which is a germ-repellent layer. This in turn reduces and/or prevents the non-specific attachment of biomolecules to the coated paper substrate. In addition, the hydrophobic/aromatic moiety (if present) allows the germ-repellent compounds to attach to the polymers in the overprint varnish via a hydrophobic interaction or a η-η interaction.

Oil-Based Varnish

Oil-based varnishes are well-known in the art and are available from a variety of suppliers worldwide. When using an oil-based varnish, then the germ-repellent agent herein may be, for example, poly(acrylaminde-co-diallyldimethylammonium chloride) (CAS #26590-05-6), and a combination thereof; or poly(acrylamide-co-acrylate-co-diallyldimethylammonium) (CAS #25136-75-8), and a combination thereof, or poly(diallyldimethylammonium chloride) (CAS #26062-79-3).

Without intending to be limited by theory, it is believed that the addition of polyelectrolytes into a (hydrophobic) oil-based varnish significantly increases the hydrophilicity of the cured varnish coating. It is believed that this allows the germ-repellent varnish on the coated paper substrate to form a stable hydration layer. The stable hydration layer forms based on the strong affinity of water molecules by electrostatic interaction and hydrogen bonding to the germ-repellent agent. This stable hydration layer prevents the formation of non-specific protein adsorption between the microbes/germs and the coated surface, allows the germs to the fall off and/or not adhere, and/or not become absorbed onto/into the paper substrate; or paper product.

In an embodiment herein, the germ is a virus; or a coronavirus; or a human coronavirus; or a coronavirus selected from the group of 229E (an alpha coronavirus), NL63 (an alpha coronavirus); OC43 (a beta coronavirus), HKU1 (a beta coronavirus), SARS-COV (a.k.a. SARS), SARS-COV-2 (a.k.a., COVID-19, 2019-nCOV), MERS-COV (a.k.a. MERS), and a combination thereof; or a coronavirus selected from the group of SARS-COV (a.k.a. SARS), SARS-COV-2 (a.k.a., COVID-19, 2019-nCOV), MERS-COV (a.k.a. MERS), and a combination thereof. Without intending to be limited by theory, it is believed that the presence of amphiphilic surface-active agents and/or the polyelectrolytes on the coated surface may, for example, disrupt the lipid bilayer and proteins of certain viral envelopes, leading to the potential leakage of unstable genetic materials from the viral envelope and/or the potential denature of one or more viral proteins. Therefore, it is believed that these viruses may be less likely to stick on the germ-repellent paper products herein, and/or that these viruses may be more likely to be easily removed from the germ-repellent paper products herein.

In an embodiment herein, the germ-repellent agent may be selected from the group of an amphiphilic surface active agent, a polyelectrolyte, and a combination thereof; or an amphiphilic surface active agent and a combination thereof; or a polyelectrolyte and a combination thereof.

In an embodiment herein, the amphiphilic surface active agent contains a hydrophilic moiety such as, for example, polyethylene glycol, an acid, a sulfate, a sulfonate, a hydrophobic moiety and a combination thereof, or a linear alkyl hydrophobic moiety, a branched alkyl hydrophobic moiety, and a combination thereof; or a salt thereof; or a sodium salt thereof. In an embodiment herein, the amphiphilic surface active agent contains an anionic surface active agent such as, for example, an acid, a sulfate, a sulfonate, a hydrophobic moiety and a combination thereof; or a linear alkyl hydrophobic moiety, a branched alkyl hydrophobic moiety, an aromatic hydrophobic moiety, and a combination thereof; or a salt thereof; or a sodium salt thereof. In an embodiment herein, the amphiphilic surface active agent contains a linear alkylbenzene sulfonate; or a $C_{10}$-$C_{13}$ linear alkylbenzene sulfonate; or a salt thereof; or a sodium salt thereof, a potassium salt thereof, or an amine salt thereof. In an embodiment herein, the amphiphilic surface active agent contains sodium decylbenzene sulfonate. In an embodiment herein, the varnish is a water-based varnish and the varnish contains an amphiphilic surface active agent.

In an embodiment herein, the polyelectrolyte may be a cationic polyelectrolyte, an anionic polyelectrolyte, a zwitterionic polyelectrolyte, and a combination thereof. The cationic polyelectrolytes useful herein include quaternary ammonium polyelectrolytes, pyridinium polyelectrolytes, phosphonium polyelectrolytes, and a combination thereof. In an embodiment herein, the anionic polyelectrolyte herein is a polyquaternium ammonium compound; or polyquaternium 7, polyquaternium 10, polyquaternium 29, and a combination hereof. In an embodiment herein, the zwitterionic polyelectrolyte useful herein is Poly(diallyldimethylammonium chloride).

In an embodiment herein, when the germ-repellent overprint varnish contains an oil-based varnish, then the germ-repellent overprint varnish further contains a polyelectrolyte. Without intending to be limited by theory, it is believed that the addition of a polyelectrolyte into a hydrophobic oil-based varnish may significantly increase the hydrophilicity and therefore efficacy of the resulting germ-repellent overprint varnish. It is believed that a germ-repellent overprint varnish on coated paper forms an even better, more stable hydration layer based on the strong affinity of water molecules by electrostatic interaction and hydrogen bonding. This stable hydration film in turn prevents the close approach of microbes and formation of non-specific protein adsorption on the coated surface.

The paper substrate useful herein may be selected from the group of book paper, art-board paper, Kraft paper, wood-free paper and a combination thereof. Without intending to be limited by theory it is believed that the paper substrate should be dried and either printed or unprinted. The varnish is typically coated; or evenly-coated, on the paper substrate; or a surface of the paper substrate, followed by curing of the varnish. Curing may typically occur by drying the varnish under heating or room temperature. Alternatively in an embodiment herein, the curing occurs via UV radiation, or a chemical process employing an initiator.

In an embodiment herein, the germ-repellent overprint varnish contains a carrier. The carrier useful herein includes an aqueous carrier, a non-aqueous carrier, and a combination thereof, or an aqueous carrier.

An aqueous carrier is employed for a water-based varnish, and the aqueous carrier may be, for example, solvent-free, environmental friendly, highly transparent, resistant to UV light, food-grade, easy to process, easy to coat on the paper substrate; or a surface of the paper substrate, easily adsorbed by the paper substrate, may provide a high gloss, and/or protect the ink of printed papers.

The aqueous carrier herein may contain a polymer dispersion; or a polyacrylate dispersion; or a polyacrylate copolymer dispersion.

In an embodiment herein, the oil-based varnish contains a non-aqueous carrier; or an organic solvent, and is coated on the paper substrate; or a surface of the paper substrate so as to provide a high gloss and/or to protect the ink of printed papers.

In an embodiment herein, the overprint varnish contains a water-based varnish, an oil-based varnish, and a combination thereof; or a water-based varnish; or an oil-based varnish; or a water-borne styrene-acrylic dispersion; or a soybean varnish.

In an embodiment herein, the germ-repellent paper product herein may contain the germ-repellent overprint varnish at a level of from about 75 mg to about 2 mg germ-repellent overprint varnish per 50 $cm^2$ (surface area of) paper substrate; or about 50 mg to about 5 mg germ-repellent overprint varnish per 50 $cm^2$ paper substrate; or about 35 mg to about 10 mg germ-repellent overprint varnish per 50 $cm^2$ paper substrate.

The germ-repellent overprint varnish contains a varnish which is either a water-based varnish or an oil-based varnish.

In an embodiment herein, the germ-repellent overprint varnish herein contains a water-based varnish and may contain the germ-repellent agent at a varnish: germ-repellent agent ratio from about 100:1 to about 1:1; or from about 75:1 to about 10:1; or from about 50:1 to 20:1 by weight.

In an embodiment herein, the germ-repellent overprint varnish herein contains an oil-based varnish and may contain the germ-repellent agent at a varnish: germ-repellent agent ratio from about 200:1 to about 1:10; or from about 100:1 to about 1:1; or from about 80:1 to 10:1 by weight.

The germ-repellent overprint varnish may further contain an emulsifier, a viscosity modifier, and a combination thereof. The emulsifier useful herein has a low cytotoxicity, and may be selected from the group of, for example Tween 20, Tween 80, Kolliphor® EL, APG 1214, Span® 20, Brij® 58, Poly(ethylene glycol) sorbitol hexaoleate, and a combination thereof. The viscosity modifier useful herein may be selected from the group of, for example, sodium polyacrylate, ammonium acryloyldimethyltaurate/VP (Aristoflex® AVC) copolymer, polyquaternium 10, and a combination thereof.

Example 1

The following germ-repellent overprint varnishes are prepared:
W40: 15 kg OPV WBS 108+0.42 kg Kolliphor RH40 (Sigma Aldrich)
W63: 15 kg Water-based OPV WBS108+0.45 kg Poly (acrylamide-co-acrylate-co-diallyldimethylammonium chloride) solution (Hangzhou Yinhu)
W112: 20 kg OPV WBS 108+0.8 kg Sodium dodecylbenzenesulfonate (Sigma Aldrich)
W124: 20 kg OPV WBS 108+1 kg Sodium dodecyl sulphate (Sigma Aldrich)
W125: 15 kg OPV WBS 108+0.45 kg Sodium bis(2-ethylhexyl) sulfosuccinate (Sigma Aldrich)+0.05 kg Sodium dodecyl sulphate (Sigma Aldrich)
W130: 20 kg OPV WBS 108+1.2 kg Sodium dodecylbenzenesulfonate (available from IRO) "OPV WBS" indicates OPV WBS108, a water-based varnish, available from Swan Coatings (M) SDN. BHD, Seleangor, Malaysia.
O2: 900 g C Ecopure M-SPEC OP varnish+45 g Kolliphor RH40 (Sigma Aldrich)
O14: 900 g C Ecopure M-SPEC OP varnish+90 g Poly (acrylamide-co-diallyldimethylammonium chloride) solution (Hangzhou Yinhu)
O24: 900 g C Ecopure M-SPEC OP varnish+90 g Poly (diallyldimethylammonium chloride) solution (Sigma Aldrich)
O25: 900 g C Ecopure M-SPEC OP varnish+90 g Poly (diallyldimethylammonium chloride) solution (SNF)

O26: 900 g C Ecopure M-SPEC OP varnish+45 g Poly (diallyldimethylammonium chloride) solution (SNF)

O27: 900 g C Ecopure M-SPEC OP varnish+18 g Poly (diallyldimethylammonium chloride) solution (SNF)

"M-SPEC OP" indicates C Ecopure M-SPEC OP varnish, by SAKATA INX.

Poly(diallyldimethylammonium) solution is available as Floquat FL 4540 from SNF.

Example 2

A water-based overprint varnish contains 38-42 wt % styrene-acrylic copolymer (CAS #24981-13-3), $(C_8H_8)_x$ $(C_3H_4O_2)_y$), 2-2.5 wt % 28% aqueous ammonia (CAS #1336-21-6), 2-3 wt % Propylene glycol (CAS #57-55-6); and the remainder (53-56 wt %) water. This varnish contains a styrene-acrylic dispersion and is heat-cured.

Example 3

An oil-based varnish contains 25-50 wt % synthesized resin (rosin; CAS #68512-70-9), ≥20 wt % soybean oil (CAS #8001-22-7), ≤10 wt % other plant oil, ≤25 wt % mineral oil (CAS #8042-47-5), ≤10 wt % polyethylene (CAS #9002-88-4), ≤5 wt % octanoic acid, cobalt salt (CAS #6700-85-2), and ≤5 wt % other minor ingredients.

Manufacturing Process:

In an embodiment herein, the germ-repellent overprint varnish (or the control varnish) is coated onto the paper substrate by the steps of an on-line process:
1) Weigh the germ-repellent agent
2) Add the germ-repellent agent into the varnish slowly along with constant stirring until the mixture turns homogenous
3) Pump/Apply the modified varnish into the printing machine (Roland 700, Germany) with a curing chamber at the end of the printing process In an embodiment herein, the germ-repellent overprint varnish is coated onto the paper substrate by the steps of an off-line process:
1) Weigh the germ-repellent agent
2) Add the germ-repellent agent into the varnish slowly along with constant stirring till the mixture turns homogenous
3) Dilute the mixture with certain amount of water to meet the viscosity required for the printing process
4) Pump/Apply the modified varnish into the printing machine (sw-b-2, Shin Chin Group Co. Ltd; Taiwan) with a curing chamber at the end of the printing process.

The germ-repellent overprint varnish may be coated on to the paper substrate by a method selected from the group of coating; dipping, brushing, and a combination thereof; or roller coating, to form a germ-repellent paper product. In other words, the coating step may be selected from a brushing step, a dipping step, a rolling step, and a combination thereof; or a brushing step, a rolling step, and a combination thereof.

The coating process useful herein may be an on-line coating process or an off-line coating process as desired. In an on-line coating process, the varnish is applied immediately on the same machine after printing. In an off-line coating process, the coating process and printing process are separated (for example, diluted varnish (for example, diluted at a weight ratio of varnish:carrier (e.g., water) of about 5:1) is coated on paper a paper substrate; or a surface of a paper substrate, by, for example, a roller coater for varnish coating in the printing industry. In an embodiment herein, the germ-repellent overprint varnish may be coated by brushing, dipping, roller coating, or a combination thereof, onto the paper substrate to form the germ-repellent paper product.

Without intending to be limited by theory, it is believed that an on-line coating may provide higher production efficiency, and an off-line coating may create a thicker varnish coating on paper.

In an embodiment herein, once the paper substrate is coated with the germ-repellent overprint varnish and cured by drying, then the paper substrate is formed into a germ-repellent paper product.

Paper Products:

In an embodiment herein, the germ-repellent paper product is selected from the group of a paper plate, a "doggie bag" container, a bag, a paper cup, a paper tablecloth, a paper napkin, a paper towel, a paper bib, and a combination thereof. In an embodiment herein, the germ-repellent paper product is selected from the group of a board book, a children's book, and a combination thereof. In an embodiment herein, the germ-repellent paper herein is further processed into a germ-repellent paper product such as a fast food boxes, a book, and a combination thereof.

Test Methods:

A germ-repellent paper sample and a control paper sample are prepared using the same method in a printing machine with same processing parameters.

Germ-Repellent Efficiency Test Protocol: (with Modifications Based Upon ISO 22196)

1) A 5 cm×5 cm paper sample (either germ-repellent paper; germ-repellent paper product, control paper; or control paper product) is place in a sanitized petri dish.
2) 1 ml of a bacterial suspension (either *S. aureus* at a concentration of $10^6$ CFU/ml or *E. coli* at a concentration of $10^6$ CFU/ml) is evenly placed on the paper sample (e.g., a germ-repellent paper product or control paper product) and incubated for 4 h at 37° C.
3) The bacterial suspension is carefully removed from the paper sample via pipette.
4) The paper sample surface is rinsed twice with 6 ml saline (0.9 wt % sodium chloride).
5) a 3M quick swab is used to swab the surface and the swab is sonicated with buffer solution for 1 minute.
6) 100 μl of the solution is added on top of a clean, sanitized plate with 25 ml cultural agar (for *E. coli*; 213000 BDDS BOTTLE NUTRIENT AGAR; for *S. aureus*: 236950 BDDS BOTTLE TRYPTIC SOY AGAR), and spread using a cell spreader.
7) The plate is incubated overnight (e.g., 16 hours) at 37° C. and the number of colonies are counted.

Without intending to be limited by theory, it is believed that the use of *E. coli* in the above test is representative of the growth of other gram-negative bacteria and that the use of *S. aureus* in the above test is representative of the growth of other gram-positive bacteria. Accordingly, it is believed that the results of this test are generally representative of other bacteria.

Based on the above test, and as used herein, the germ-repellent efficacy is calculated as:

[average #cfu from the control paper−average #cfu from germ-repellent paper]*100% [average #cfu from the control paper]

As used herein the term "cfu" indicates bacterial colony forming units.

In an embodiment herein, the germ-repellent paper possesses a germ-repellent efficiency for *S. aureus* of at least about 50%; or from about 50% to about 100%; or at least about 75%; or from about 75% to about 100%; or at least about 85%; or from about 85% to about 100%; or at least about 90%; or from about 90% to about 100%; or at least about 95%; or from about 95% to about 100%; or at least 97%; or from about 97% to about 100%. In an embodiment herein, the germ-repellent plastic possesses a germ-repellent efficiency for *E. coli* of from at least about 50%; or from about 50% to about 100%; or at least about 65%; or from about 65% to about 100%; or at least about 75%; or from about 75% to about 100%; or at least about 80%; or from about 80% to about 100%; or at least about 82.5%; or from about 82.5% to about 100%; or at least 97%; or from about 97% to about 100%; or from about 75% to about 95%; or from about 80% to about 95%.

Additional testing protocols useful herein may include, for example:

U.S.F.D.A. Regulation 21 CFR Part 176.170 on paper & paperboard; U.S.F.D.A. Regulation Part 21 CFR 175.300 Clause c4 on coating intended for repeated use and employed as a component of non-container; Resolution AP (2002) 1-Formaldehyde content on Paper and Paperboard; Resolution AP (2002)1 Paper and Board Material and Articles Intended to Come into Contact with Foodstuffs on pentachlorophenol (PCP) content; Resolution AP (2002)1 Paper and Board Material and Articles Intended to Come into Contact with Foodstuffs on migration of heavy metal content; Resolution AP (2002)1 Paper and Board Material and Articles Intended to Come into Contact with Foodstuffs on fastness of fluorescent whitening agents; Resolution AP (2002) 1-migration of Benzophenone and 4-Methylbenzophenone content on Paper and Paperboard; Resolution AP (2002)1 Paper and Board Material and Articles Intended to Come into Contact with Foodstuffs on determination of the transfer of antimicrobial constituents; ASTM F963 Soluble heavy metal; EN 71-3:2013+A1:2014 19 Toxic elements; DIN 10955:2004 Sensory test; ISO 2813:1994, Paints and varnishes—Determination of specular gloss of non-metallic paint films at 20°, 60° and 85° (gloss value, using a KSJ Portable Glossmeter WGG60-Y4); ISO 7724 (all parts), Paints and varnishes—Colorimetry (color test—using a PCE-CSM 6 colorimeter); ISO 2884-3:1999, Paints and varnishes—Determination of viscosity using rotary viscometers (viscosity—using a Brookfield DV1 Viscometer); and/or a scuff-resistance test.

Aging Test:

A sample is placed in an oven at 60° ° C. for 48 hours. This simulates 1 month of time during transportation.

A sample is placed in an oven at 60° C. for 33 days. This simulates 1 year of shelf life. This is a modification of test method ASTM F1980.

Example 4

Three replicates of a printed art-board paper box is coated with a water-based varnish (OPV WBS108) as a control, while the same varnish+4.76 wt % sodium dodecylbenzene sulfonate (Sigma Aldrich) was added for the test sample. The samples are off-line coated with the appropriate varnish to form a control paper product and a test paper product. After drying/curing and 48-hours of 60° C. aging, the samples were tested for germ-repellent efficacy, and the results averaged.

The test paper product samples provided 96.6% germ-repellent efficacy vs. the control paper product samples with *S. aureus*. The test paper product samples provided 81.1% germ-repellent efficacy vs. the control paper product samples with *E. coli*.

Example 5

Three replicates of a printed art-board paper box is coated with C Ecopure M-SPEC OP varnish as a control, while the same varnish+9 wt % Poly(diallyldimethylammonium chloride) solution (Sigma Aldrich) was added for the test sample. The samples are off-line coated with the appropriate varnish to form a control paper product and a test paper product. After drying/curing and 48-hours of 60° C. aging, the samples were tested for germ-repellent efficacy, and the results averaged.

The test paper product samples provided >99.9% germ-repellent efficacy vs. the control paper product samples with *S. aureus*. The test paper product samples provided >99.9% germ-repellent efficacy vs. the control paper product samples with *E. coli*.

Example 6

Three replicates of a printed art-board paper box is coated with C Ecopure M-SPEC OP varnish as a control, while the same varnish+4.76 wt % Poly(diallyldimethylammonium chloride) solution (SNF) was added for the test sample. The samples are off-line coated with the appropriate varnish to form a control paper product and a test paper product. After drying/curing and 48-hours of 60° ° C. aging, the samples were tested for germ-repellent efficacy, and the results averaged.

The test paper product samples provided >99.9% germ-repellent efficacy vs. the control paper product samples with *S. aureus*. The test paper product samples provided >99.9% germ-repellent efficacy vs. the control paper product samples with *E. coli*.

Example 7

Three replicates of a printed art-board paper box is coated with C Ecopure M-SPEC OP varnish as a control, while the same varnish+4.76 wt % Poly(diallyldimethylammonium chloride) solution (SNF) was added for the test sample. The samples are off-line coated with the appropriate varnish to form a control paper product and a test paper product. After drying/curing and 33 days of 60° ° C. aging, the samples were tested for germ-repellent efficacy, and the results averaged.

The test paper product samples provided >99.9% germ-repellent efficacy vs. the control paper product samples with *S. aureus*. The test paper product samples provided >99.9% germ-repellent efficacy vs. the control paper product samples with *E. coli*.

Example 8

Three replicates of a printed art-board paper box is coated with a water-based varnish (OPV WBS108) as a control, while the same varnish+4.76 wt % sodium dodecylbenzene sulfonate (Sigma Aldrich) was added for the test sample. The samples are off-line coated with the appropriate varnish to form a control paper product and a test paper product. After drying/curing and 33 days of 60° C. aging, the samples were tested for germ-repellent efficacy, and the results averaged.

The test paper product samples provided >98.8% germ-repellent efficacy vs. the control paper product samples with *S. aureus*. The test paper product samples provided >74.3% germ-repellent efficacy vs. the control paper product samples with *E. coli*.

Example 9

Three replicates of a printed art-board paper box is coated with C Ecopure M-SPEC OP varnish as a control, while the same varnish+1.96 wt % Poly(diallyldimethylammonium chloride) solution (SNF) was added for the test sample. The samples are off-line coated with the appropriate varnish to form a control paper product and a test paper product. After drying/curing and 48-hours of 60° C. aging, the samples were tested for germ-repellent efficacy, and the results averaged.

The test paper product samples provided >99.9% germ-repellent efficacy vs. the control paper product samples with *S. aureus*. The test paper product samples provided >99.9% germ-repellent efficacy vs. the control paper product samples with *E. coli*.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A germ-repellent paper product, comprising:
   A) a paper substrate; and
   B) a germ-repellent overprint varnish comprising:
      i. an oil-based varnish; and
      ii. a germ-repellent agent selected from the group consisting of an amphiphilic surface active agent, a polyelectrolyte, and a combination thereof,
   wherein the germ-repellent overprint varnish is coated onto the paper substrate by a method selected from the group consisting of coating, dipping, brushing, and a combination thereof.

2. The germ-repellent paper product according to claim 1, wherein the paper substrate is selected from the group consisting of book paper, art-board paper, Kraft paper, wood-free paper, and a combination thereof.

3. The germ-repellent paper product according to claim 1, wherein the overprint varnish further comprises a water-based varnish, or a water-borne styrene-acrylic dispersion, or a soybean varnish.

4. The germ-repellent paper product according to claim 1, wherein the germ-repellent agent is selected from the group consisting of sodium sulfate, sodium lauryl sulfate, sodium bis (2-ethylhexyl) sulfosuccinate, sodium alkylbenzene sulfonate, sodium dodecylbenzenesulfonate, and a combination thereof.

5. The germ-repellent paper product according to claim 1, wherein the germ-repellent is selected from the group consisting of poly (acrylamide-co-diallyldimethylammonium chloride), poly (acrylamide-co-acrylate-co-diallyldimethylammonium chloride), poly (diallyldimethylammonium chloride), and a combination thereof.

6. The germ-repellent paper product according to claim 1, wherein the paper product is selected from the group consisting of a packaging material, a reading material, and a combination thereof.

7. The germ-repellent paper product according to claim 1, wherein the germ-repellent overprint varnish comprises a germ-repellent agent selected from the group consisting of about 1 wt % to about 10 wt % poly (diallyldimethylammonium chloride) solution at a concentration of from about 25 wt % to about 75 wt %, from about 3 w % to about 6 wt % sodium dodecylbenzenesulfonate, and a combination thereof.

8. The germ-repellent paper product according to claim 1, having a germ-repellent efficiency for gram-positive bacteria of at least about 50% as compared to a comparable paper product.

9. The germ-repellent paper product according to claim 1, wherein the germ-repellent paper product passes a test selected from the group consisting of U.S.F.D.A. Regulation 21 C.F.R. Part 176.170 on paper & paperboard; U.S.F.D.A. Regulation Part 21 C.F.R. 175.300(c)(4) on coating intended for repeated use and employed as a component of non-container; Resolution AP (2002) 1-Formaldehyde content on Paper and Paperboard; Resolution AP (2002) 1 Paper and Board Material and Articles Intended to Come into Contact with Foodstuffs on pentachlorophenol (PCP) content; Resolution AP (2002) 1-Paper and Board Material and Articles Intended to Come into Contact with Foodstuffs on migration of heavy metal content; Resolution AP (2002) 1 Paper and Board Material and Articles Intended to Come into Contact with Foodstuffs on fastness of fluorescent whitening agents; Resolution AP (2002) 1-migration of Benzophenone and 4-Methylbenzophenone content on Paper and Paperboard; Resolution AP (2002) 1-Paper and Board Material and Articles Intended to Come into Contact with Foodstuffs on determination of the transfer of antimicrobial constituents; DIN 10955:2004 Sensory Test, and a combination thereof.

10. The germ-repellent paper product according to claim 1, wherein the germ-repellent paper product passes a toy safety test selected from the group consisting of ASTM F963 Soluble heavy metal, EN 71-3 Toxic elements, and a combination thereof.

11. The germ-repellent paper product according to claim 1, wherein the germ-repellent efficiency is at least 70% after an aging test of 48 hours at 60° C.

12. The germ-repellent paper product according to claim 1, having a germ-repellent efficiency for gram-negative bacteria of at least about 50% as compared to a comparable paper product.

13. The germ-repellent paper product according to claim 1, wherein the germ-repellent efficiency is at least 70% after an aging test of 33 days at 60° C.

14. A process for manufacturing a germ-repellent paper product comprising the steps of:
   A) providing a paper substrate comprising a surface;
   B) providing a germ-repellent overprint varnish comprising:
      i) a germ-repellent agent selected from the group consisting of an amphiphilic surface active agent, a polyelectrolyte, and a combination thereof; and
      ii) an oil-based varnish;

C) coating the surface of the paper substrate with the germ-repellent overprint varnish; and D) curing the germ-repellent overprint varnish.

15. The process according to claim 14, wherein the process is conducted in a paper product-making process.

16. The process according to claim 14, wherein the process is conducted after a printing process.

17. The process according to claim 14, wherein the coating step is selected from the group consisting of a brushing step, a dipping step, a rolling step, and a combination thereof.

18. The process according to claim 14, wherein the curing step is conducted under a condition selected from the group consisting of heating, and at room temperature.

\* \* \* \* \*